(12) United States Patent
Soer et al.

(10) Patent No.: US 10,582,589 B2
(45) Date of Patent: Mar. 3, 2020

(54) LIGHTING SYSTEM WITH INTEGRATED SENSOR

(71) Applicant: Lumileds LLC, San Jose, CA (US)

(72) Inventors: Wouter Soer, San Jose, CA (US); Willem Sillevis-Smitt, San Jose, CA (US)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 16/015,697

(22) Filed: Jun. 22, 2018

(65) Prior Publication Data
US 2019/0394853 A1    Dec. 26, 2019

(51) Int. Cl.
| | |
|---|---|
| H05B 33/08 | (2006.01) |
| H05B 37/02 | (2006.01) |
| G06T 7/90 | (2017.01) |
| F21V 5/04 | (2006.01) |
| F21V 23/00 | (2015.01) |

(52) U.S. Cl.
CPC .......... H05B 33/0869 (2013.01); G06T 7/90 (2017.01); H05B 37/0218 (2013.01); *F21V 5/04* (2013.01); *F21V 23/003* (2013.01)

(58) Field of Classification Search
CPC .. H05B 33/0869; H05B 37/0218; G06T 7/90; F21V 23/003; F21V 5/04

USPC .......................................................... 315/153
See application file for complete search history.

(56) References Cited

U.S. PATENT DOCUMENTS

| | | | |
|---|---|---|---|
| 7,710,369 B2 * | 5/2010 | Dowling | G03G 15/0435 345/83 |
| 9,332,612 B1 | 5/2016 | Weaver | |

FOREIGN PATENT DOCUMENTS

EP        2473008 A2    7/2012

* cited by examiner

*Primary Examiner* — Daniel D Chang

(57) ABSTRACT

Techniques and devices are provided for sensing image data from a scene and activating primary light sources based on information sensed from the scene. Subsets of a plurality of primary light sources may be activated to emit sensing spectrum of light onto a scene. Combined image data may be sensed from the scene while the subsets of the plurality of primary light sources are activated. Reflectance information for the scene may be determined based on the combined image data and combined sensing spectra. Spectrum optimization criteria for the primary light sources may be determined based on the reference information and a desired output parameter provided by a user or determined by a controller. The plurality of primary light sources may be activated to emit a lighting spectrum based on the spectrum optimization criteria.

16 Claims, 13 Drawing Sheets

100

110 — Activate a first subset of primary light sources to emit a first sensing spectrum onto a scene 120 — Sense first image data from the scene while the first subset is activated 130 — Activate a second subset of primary light sources to emit a second sensing spectrum onto a scene 140 — Sense second image data from the scene while the second subset is activated 150 — Determine reference information for the scene based on the combined image data based on the first image data and the second image data 160 — Determine spectrum optimization criteria for the primary light sources based on the reflectance information and desired output parameter 170 — Activate the plurality of primary light sources to emit a lighting spectrum based on the spectrum optimization criteria

FIG. 1

LIGHTING SYSTEM WITH INTEGRATED SENSOR

BACKGROUND

Tunable lighting systems may be used to illuminate one or more scenes containing objects and may be adjustable such that the light output by such systems is varied based on user input. Such tunable lighting systems may be adjusted to, for example, increase or decrease the amount and/or type of light that is illuminated onto a scene. Further, such tunable lighting systems may include multiple light sources, such as multiple light bulbs, to illuminate a scene.

SUMMARY

The following description includes techniques and devices provided for sensing image data from a scene and activating primary light sources based on the image data. Subsets of a plurality of primary light sources may be activated to emit a sensing spectrum of light onto a scene. Image data may be sensed from the scene while the subsets of the plurality of primary light sources are activated. Reflectance information for the scene may be determined based on the combined image data. Spectrum optimization criteria for the primary light sources may be determined based on the reference information and a desired output parameter provided by a user or determined by a controller. The plurality of primary light sources may be activated to emit a lighting spectrum based on the spectrum optimization criteria.

BRIEF DESCRIPTION OF THE DRAWINGS

A more detailed understanding may be had from the following description, given by way of example in conjunction with the accompanying drawings wherein:

FIG. 1 is a flowchart for activating primary light sources based on spectrum optimization criteria;

DETAILED DESCRIPTION

Figure 2:
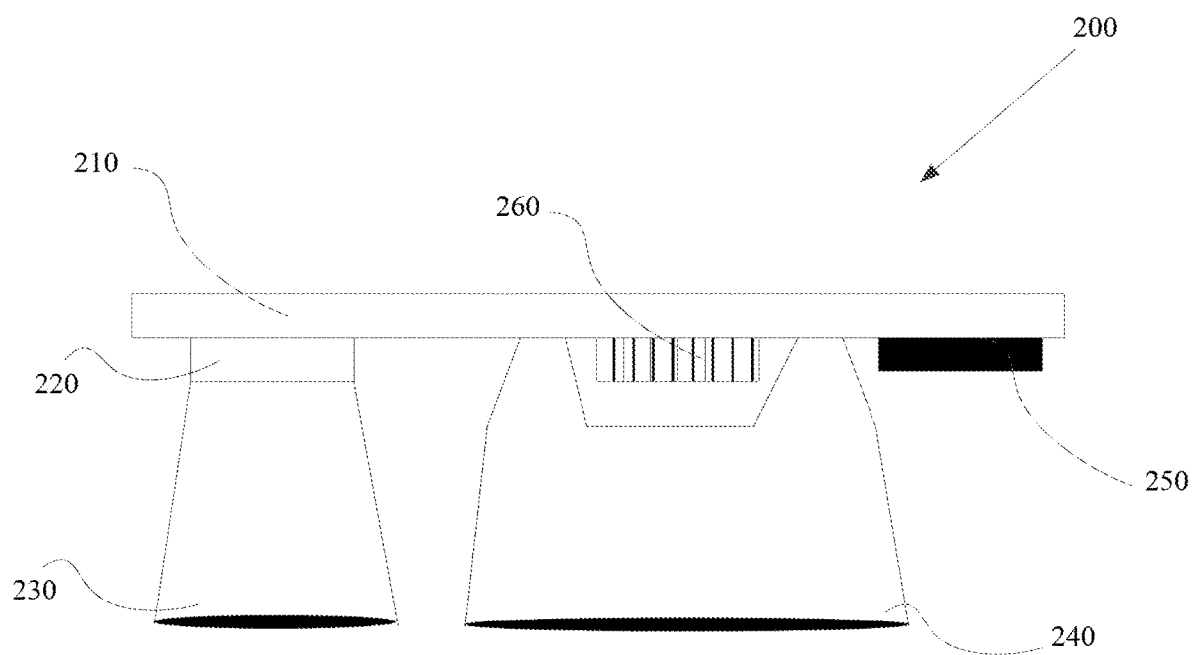
FIG. 2 is an example diagram of a image sensor, controller, and plurality of primary light sources.

Examples of different lighting, tunable lighting, sensor, and/or light emitting diode ("LED") implementations will be described more fully hereinafter with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Tunable lighting arrays, including those with primary light sources, may support applications that benefit from distributed intensity, spatial, and temporal control of light distribution. Primary light sources may be light emitting devices such as LEDs that emit a given color. Tunable lighting array based applications may include, but are not limited to, precise spatial patterning of emitted light from pixel blocks or individual pixels. Depending on the application, emitted light may be spectrally distinct, adaptive over time, and/or environmentally responsive. The light emitting arrays may provide scene based light distribution in various intensity, spatial, or temporal patterns. The emitted light may be based at least in part on received sensor data, as disclosed herein. Associated optics may be distinct at a pixel, pixel block, or device level. Common applications supported by light emitting arrays include architectural and area illumination, professional lighting, retail lighting and/or exhibition lighting, and the like.

Use of a tunable light system, including primary light sources, may provide controlled illumination of portions of a scene for a determined amount of time. This may allow the array to, for example, emphasize certain colors or color properties within a scene, emphasize white backgrounds, emphasize moving objects and/or the like. Architectural and area illumination may also benefit from the lighting disclosed herein.

In various applications where tunable lighting systems are used, an optimal lighting spectrum may vary based on the illuminated scene. The variation may be a result of the objects, colors, and angles presented in the scene and may also vary based on one or more intended desired output parameters. As manual adjustment of the lighting spectrum with each scene change may not be practical, as disclosed herein, a tunable lighting system may automatically adjust the lighting spectrum based on the scene to be illuminated and/or one or more desired output parameters.

According to implementations disclosed herein, as shown in FIG. 1 via flow chart 100, a first subset of a plurality of primary light sources may be activated to emit a first sensing spectrum onto a scene at 110. As described herein, the sensing spectrum may refer to the light emitted by a subset of the plurality of primary light sources while image data is collected via an image sensor. The sensing spectrum may include light that is not visible to a human viewing the scene. At 120, first image data may be sensed from the scene while the first subset of the plurality of primary light sources are activated. At 130 a second subset of the plurality of primary light sources may be activated to emit a second sensing spectrum onto a scene. At 140, second image data may be sensed from the scene while the second subset of the plurality of primary light sources are activated. Notably, the plurality of light sources may be activated in subsets such that a subset is activated, image data is collected while that subset is activated, and then another subset is activated and additional image data is collected. This process may be repeated such that each subset of the plurality of primary light sources corresponds to a primary light source and image data is collected as each primary light source is activated. Preferably, at least four or five primary light sources may be provided in a lighting system disclosed herein.

At 150, reference information for the scene may be determined based on combined image data where combined image data is a combination of the first image data and the second image data. This combined image data may be collected by combining image data while different subsets of the plurality of primary light sources are activated. It should be noted that combined image data does not necessarily refer to different image data that is added together as combined image data may simply be the collection of a number of different image data. At 160, spectrum optimization criteria for the plurality of primary light sources may be determined based on the reference information and one or more desired output parameters. The desired output parameters may be input by a user or a component or may be determined based on the scene, as further disclosed herein. At 170, the plurality of primary light sources may be activated to emit a lighting spectrum based on the spectrum optimization criteria. As described herein, the lighting spectrum may refer to the light emitted by the plurality of primary light sources based on the spectrum optimization criteria such that the lighting spectrum is visible to a human viewing the scene.

FIG. 2 shows an example diagram of a lighting system 200 as disclosed herein. A substrate 210 may be a mount or housing on which the components of the lighting system 200 are attached to or placed on. A plurality of primary light sources 260 may be provided and may emit light as disclosed herein. The plurality of primary light sources 260 may be separately addressable channels such that a first channel may correspond to a first primary light source (e.g., LEDs that emit red light) and a second channel may correspond to a second primary light source (e.g., LEDs that emit royal blue light). A first optic lens 240 may be proximate to the primary light sources 260 such that all or a part of the light emitted by the primary light sources 260 may pass through the first lens 240 and may be shaped or adjusted by the first optic lens 240. It should be noted that although the first optic lens 240 is shown as one component, it may be a combination of multiple components and multiple components may be configured such that one or a subset of the components are aligned with one or a subset of the plurality of primary light sources.

Additionally, an image sensor 220 may be provided and may be in connection with the substrate 210 or generally within the same housing as the plurality of primary light sources 260. Alternatively, the image sensor 220 may be separate from the plurality of primary light sources 260 and may be provided in a separate housing. A second optic lens 230 may be proximate to the image sensor 220 such that all or a part of the image data sensed or gathered by the image sensor 220 may pass through the second optic lens 230 and may be shaped or adjusted by the second optic lens 230.

Additionally, a controller 250 may be provided and may be in connection with the substrate 210 or generally within the same housing as the plurality of primary light sources 260 and image sensor 220. Alternatively, the controller 250 may be separate from the plurality of primary light sources 260 and/or image sensor 220 and may be provided in a separate housing. The controller 250 may be configured to receive data from the image sensor 220 and/or the plurality of primary light sources 260 and may also provide control or other information to the plurality of primary light sources 260 and/or image sensor 220.

According to an implementation of the disclosed subject matter, as shown in FIG. 1 at 110, a first subset of a plurality of primary light sources may be activated to emit a first sensing spectrum onto a scene. The first subset of the plurality of primary light sources may correspond to a channel that activates one or more light sources that correspond to a primary color (e.g., red). As an example, at 110, the red light emitting diodes (LEDs) of a plurality of primary light sources 260 of FIG. 2 may be activated. The light sources that correspond to a primary color may be grouped together or, preferably, may be spread out across an array of light sources. For example, as shown in FIG. 2, primary light sources 260 include a plurality of light sources. The red LEDs may be spread out throughout the light sources 260 such that they can reach various sections of a scene. At 110 of FIG. 1, the first subset of the plurality of light sources may be activated such that their activation is not visible to a human viewing the scene due to, for example, a high frequency, short duration, and/or low amplitude modulation at which the activation occurs. As shown in FIG. 2, the light from the first subset of primary light sources 260 may emit via the first optic lens 240.

Figure 3A:
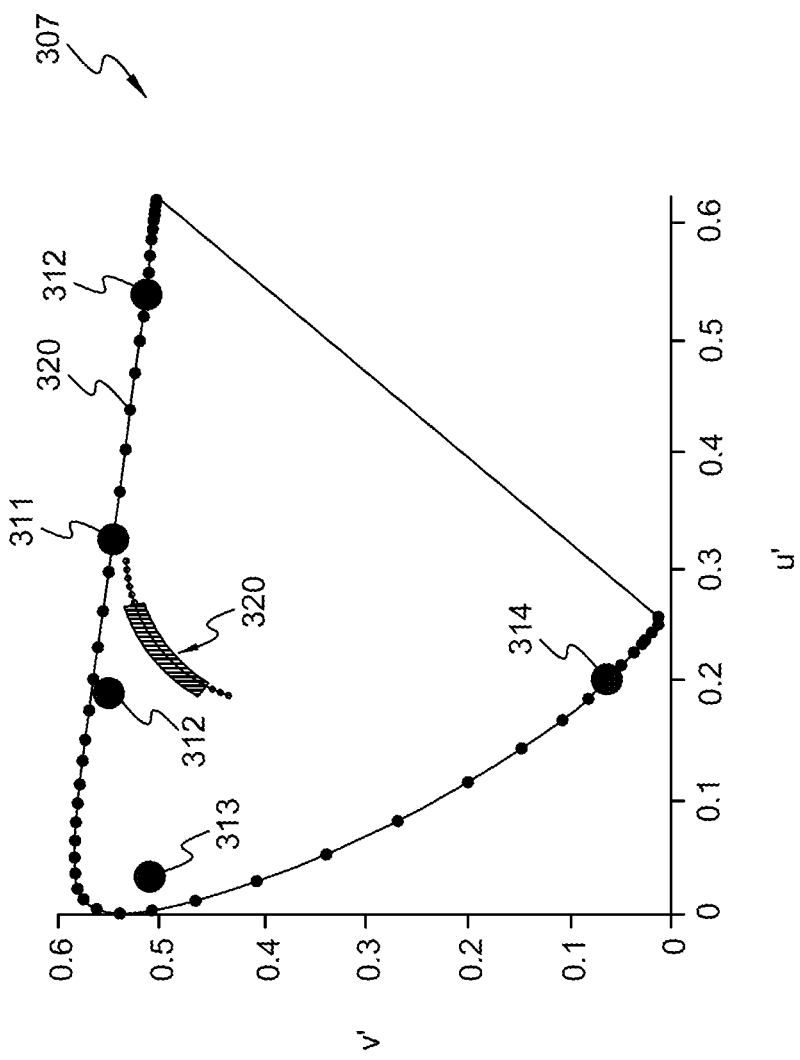
FIG. 3A is an example chart of chromaticities of five primaries.
Figure 3B:
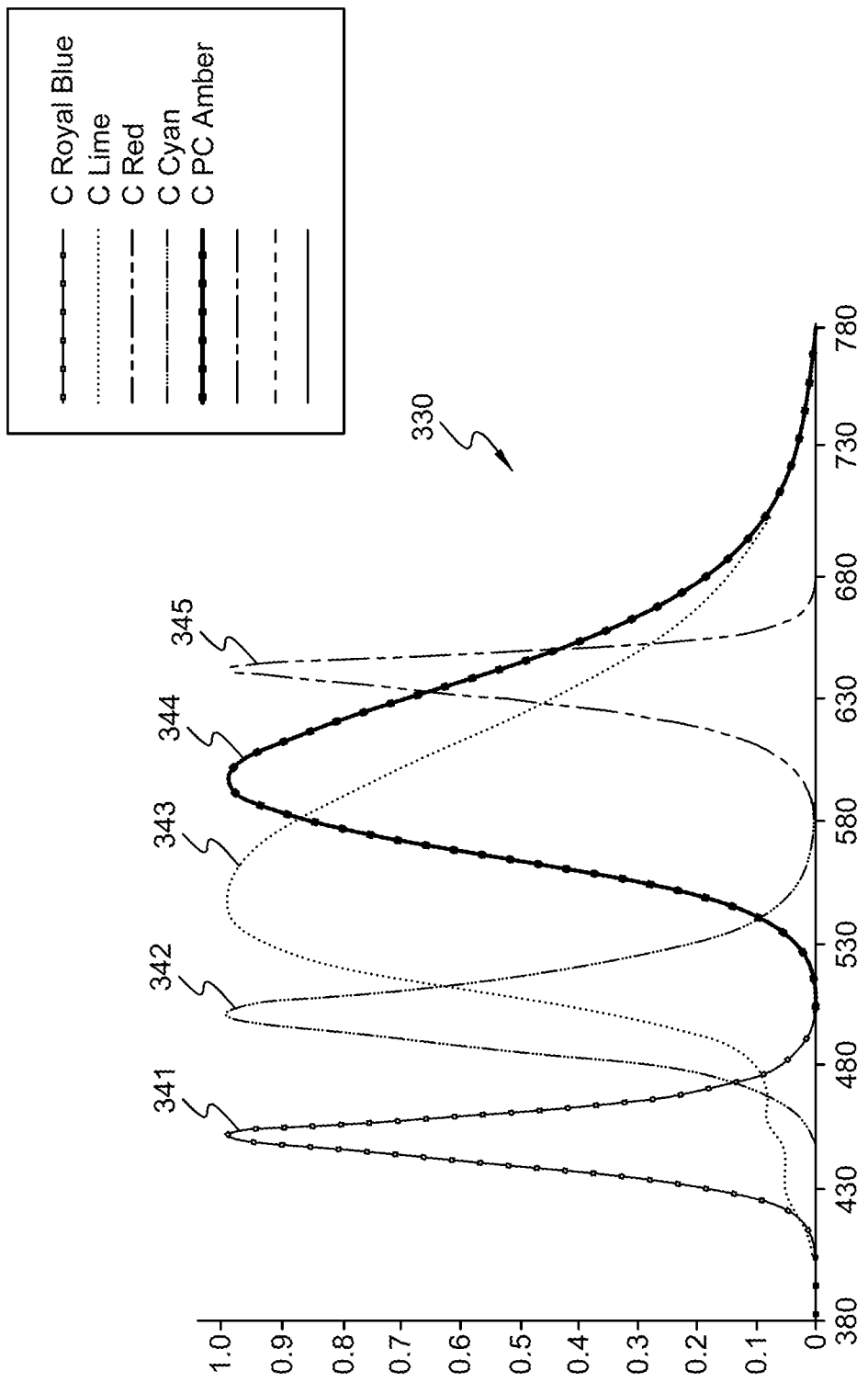
FIG. 3B is an example chart of the spectra of five primaries.

The primary light sources 260 may include, for example, primary colors royal blue, cyan, lime, amber, and red. Properties of the primary light sources 260, used in accordance with the subject matter disclosed herein, may be known to the system, and specifically, for example, may be known to the controller 250. As an example, the primary light sources 260 may have chromaticities as shown in FIG. 3A and wavelength spectra as shown in FIG. 3B. Each of the dots in FIG. 3A including 310, 311, 312, 313, and 314 may correspond to one of the five primaries of the primary light sources 260, in this example. The dotted line may correspond to a single wavelength. As shown, by using at least three primaries, a curved blackbody locus 320 may be followed more closely, for example, in a tunable white system. According to an implementation, the color output by the primary light sources 260 of FIG. 2 may have chromaticity corresponding to the area enclosed by the dots in FIG. 3A including 310, 311, 312, 313, and 314. Further, FIG. 3B shows the spectra 341, 342, 343, 344, and 345, corresponding to the five primaries in this example.

Figure 4A:
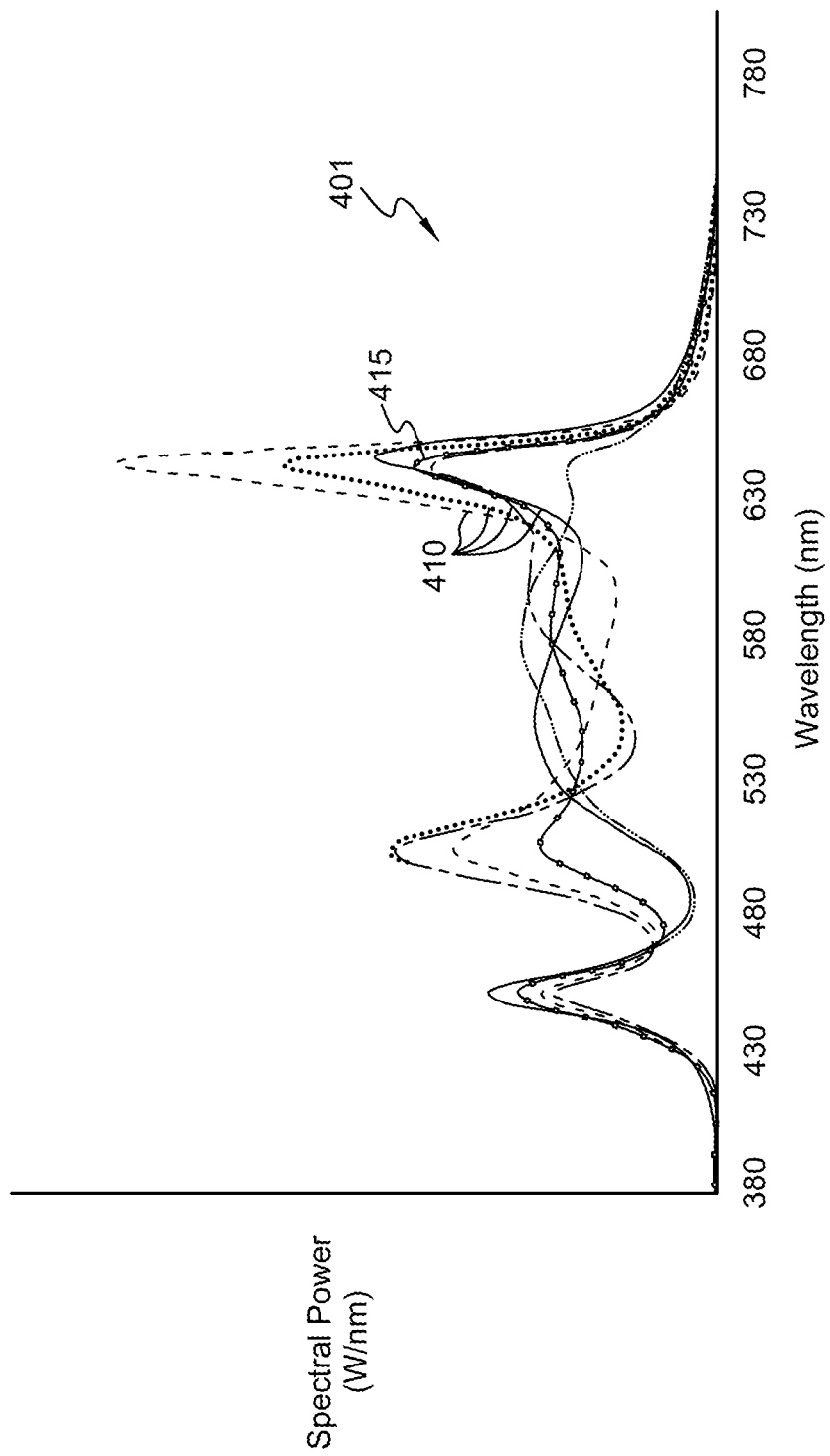
FIG. 4A is an example chart of spectra of the five primaries of FIGS. 3A and 3B with their corresponding TM-30 indices including spectral power plotted against wavelength.
Figure 4B:
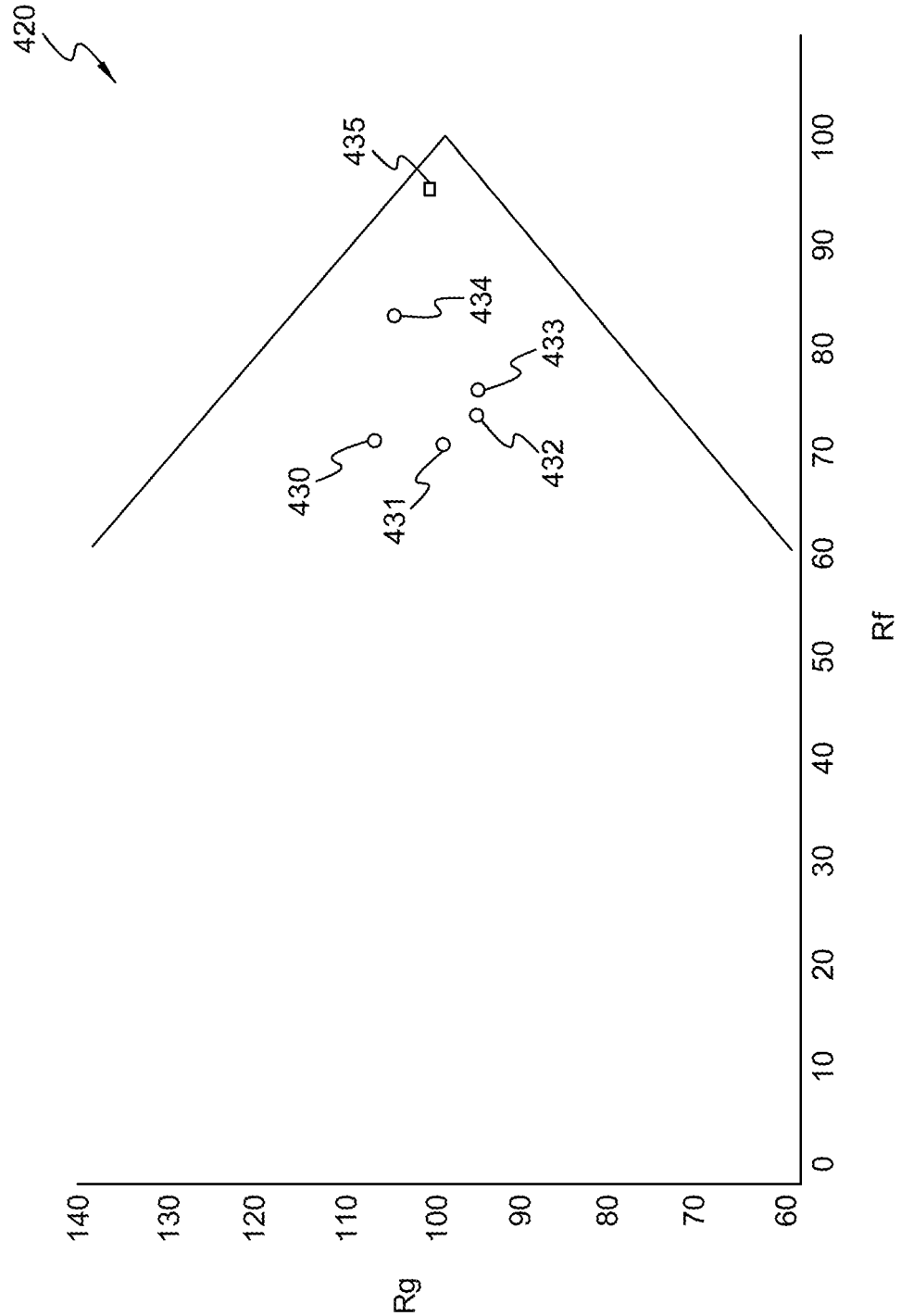
FIG. 4B is an example chart of spectra of the five primaries of FIGS. 3A and 3B with their corresponding TM-30 indices including Rg plotted against Rf.
Figure 4C:
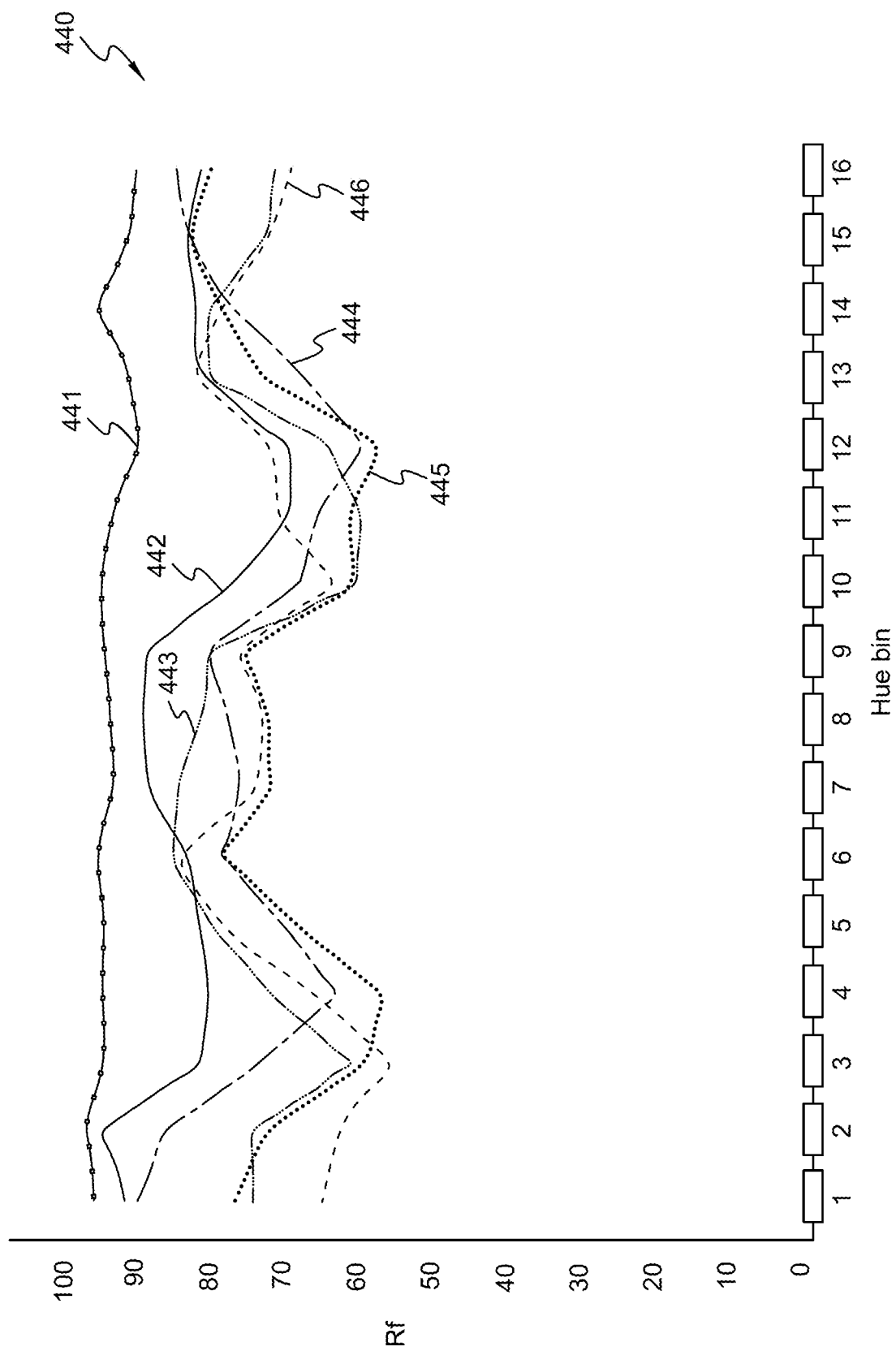
FIG. 4C is an example chart of spectra of the five primaries of FIGS. 3A and 3B with their corresponding TM-30 indices including Rf plotted against hue bins.
Figure 4D:
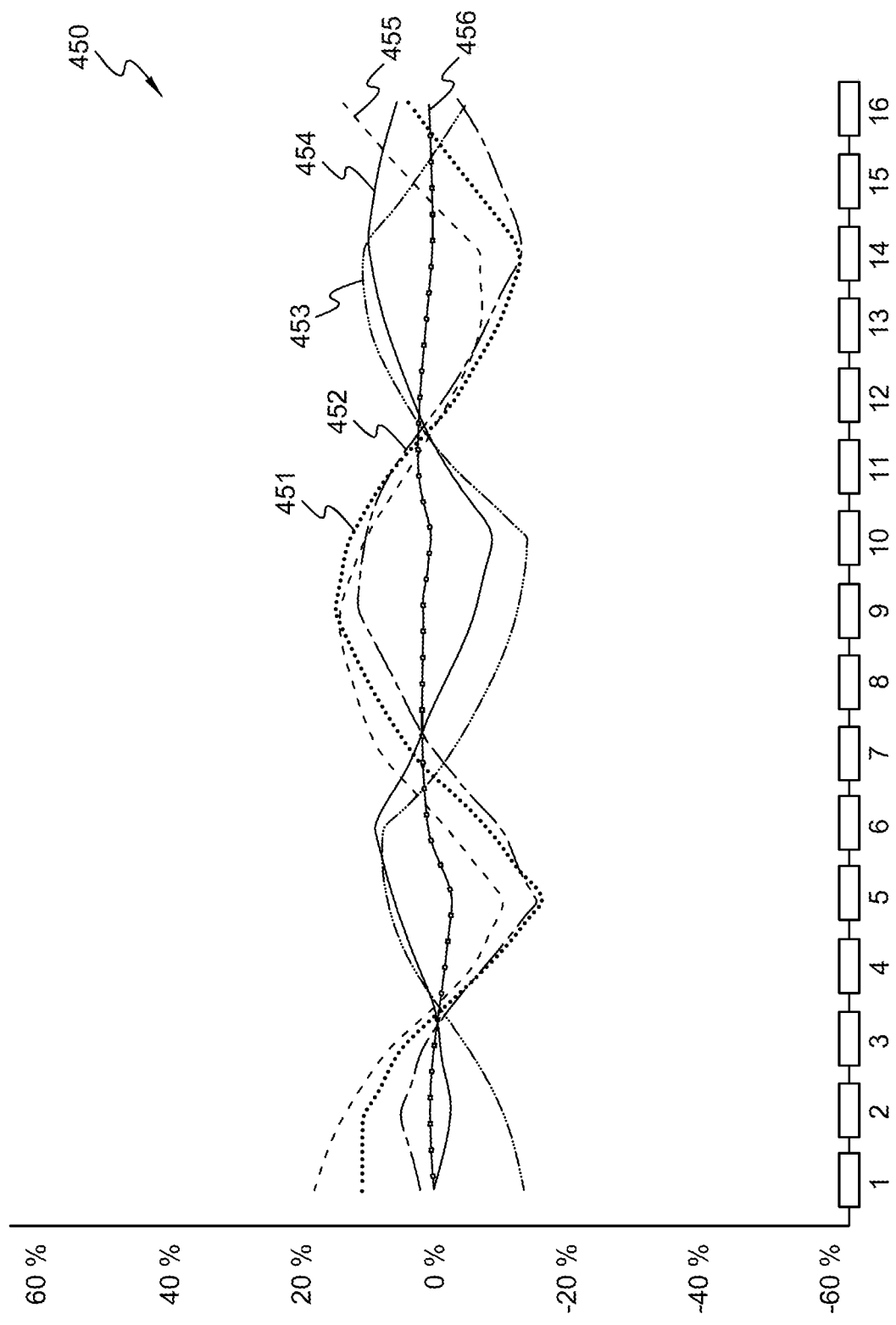
FIG. 4D is an example chart of spectra of the five primaries of FIGS. 3A and 3B with their corresponding TM-30 indices including Rcs plotted against hue bins.

Further, FIG. 4A shows a graphical depiction of the spectral power distribution 410 of spectra generated by activating multiple of the primary light sources in different ratios, in order to create different color rendering modes according to implementations of this disclosure. The spectral power distribution 415 corresponds to a color rendering mode that gives the maximum color fidelity within the range of the primaries, specifically the five primaries in this example. FIG. 4B shows a graphical depiction 420 of the gamut index $R_g$ and fidelity index $R_f$ where the gamut index $R_g$ is the TM-30 measure for average relative gamut and the fidelity index $R_f$ is the TM-30 measure for average color fidelity. As shown, the points 430, 431, 432, 433, and 434 corresponds to the different color rendering modes and the square 435 corresponds to a maximum color fidelity mode. FIG. 4C shows a graphical depiction 440 of $R_f$ values as a function of the sixteen hue bins of TM-30. As shown, data lines 442, 443, 444, 445, and 446 correspond to the $R_f$ values for the corresponding hue bins for the different color rendering modes. Data line 441 corresponds to a maximum color fidelity mode. FIG. 4D shows a graphical depiction 450 of $R_{cs}$ values as a function of the sixteen hue bins of TM-30. As shown, data lines 451, 452, 453, 454, and 45 correspond to the $R_{CS}$ values for the corresponding hue bins for the different color rendering modes. Data line 456 corresponds to a maximum color fidelity mode.

At 120 of FIG. 1, first image data may be sensed from the scene while the first subset of the plurality of primary light sources are activated. As shown in FIG. 2, the first image data may be sensed using an image sensor 220 and the first image data sensed by the image sensor 220 may reach the image sensor 220 via the second optic lens 230. As further disclosed herein, image data may include characteristics about the scene that may enable the controller 250 to approximate the reflectance spectrum for each pixel of the image sensor and/or create a color map of the scene.

The image sensor 220 may be a light sensor with spatial resolution such that the image sensor 220 and/or controller 250 may avoid averaging out the different colors present in a scene illuminated by the process described by step 110 of FIG. 1. Notably, because the controller 250 controls the subsets of a plurality of primary light sources as they are activated to emit sensing spectrums onto a scene, the image sensor does not need to have wavelength-resolving capability in order to obtain information. To clarify, the controller 250 may utilize the known information about the primary light sources 260, as subsets of the primary light sources 260 emit light onto a scene, in order to obtain color information about the scene. Accordingly, by modulating the subsets of the primary light sources 260, and by sensing the reflected image, as further disclosed herein, spectral information about the scene may be obtained without using a spectrally selective sensor. It should be noted that because the spectral information, via the image data, is obtained based on the light emitted by the subsets of primary light sources 260, the resolution of the spectral information is limited by the bandwidth of the primary light sources 260. However, it should be noted that such spectral information is sufficient to optimize color rendering by the primary light sources 260 because the primary light sources 260 will have the same limitation in spectral rendering when emitting a lighting spectrum as they have when emitting the sensing spectrum.

At 130, a second subset of the plurality of primary light sources may be activated to emit a second sensing spectrum onto the scene. The second subset of the plurality of primary light sources may correspond to a channel that activates one or more light sources that correspond to a different color (e.g., royal blue) than the first subset of the plurality of primary light sources. As an example, at 130, the royal blue light emitting diodes (LEDs) of a plurality of primary light sources 260 of FIG. 2 may be activated. The light sources that correspond to the royal blue color may be grouped together or, preferably, may be spread out across an array of primary light sources 260. For example, as shown in FIG. 2, primary light sources 260 include a plurality of light sources. The royal blue LEDs may be spread out throughout the primary light sources 260 such that they can reach various sections of a scene. At 130 of FIG. 1, similar to 110, the second subset of the plurality of light sources may be activated such that their activation is not visible to a human viewing the scene due to, for example, a high frequency, short duration, and/or low amplitude modulation at which the activation occurs. As shown in FIG. 2, the light from the second subset of primary light sources 260 may emit via the first optic lens 240.

At 140 of FIG. 1, second image data may be sensed from the scene while the second subset of the plurality of primary light sources 260 of FIG. 2 are activated. The second image data may be sensed using an image sensor 220 and the second image data sensed by the image sensor 220 may reach the image sensor 220 via the second optic lens 230. As further disclosed herein, image data may include characteristics about the scene that may enable the controller 250 to approximate the reflectance spectrum for each pixel of the image sensor and/or create a color map of the scene.

The controller 250, which may be factory programmed or user programmable to provide the desired response, as further disclosed herein, may modulate the primary light sources 260 such that the first subset is activated and the image sensor 220 collects first image data and then the second subset is activated and then the image sensor 220 collects second image data. It will be understood that although the disclosure references a first and second image data corresponding to a first spectrum and second spectrum respectively, image data may be sensed for additional available primary light sources. Preferably, four or more and more preferably, five or more primary light sources may be available. Accordingly, third, fourth and fifth image data corresponding to third, fourth and fifth spectrums, respectively, may be sensed and provided to a controller such as controller 250 of FIG. 2.

At 150 of FIG. 1, reference information for the scene may be determined based on combined image data where combined image data is a combination of the available image data such as the first image data and the second image data. A controller, such as controller 250 of FIG. 2, may determine the reference information based on combined image data such as the combination of the first image data and the second image data. Additionally, according to an implementation, the controller may also have sensing spectrum information regarding the primary light sources 260. FIGS. 4A-D, as described herein, provide example graphical depictions of spectra and corresponding TM-30 indices that the controller may have or have access to and that can be realized with the primary light sources of FIG. 3A and FIG. 3B.

The reference information may correspond to an estimate of an approximate reflectance spectrum for each pixel of the image sensor and, thus, may correspond to a color map of the scene. According to an implementation, the color map may be expressed as the relative response of each pixel to each of the subsets of the primary light sources 260 of FIG. 2. As an example, Table 1 includes the relative reflected intensities sensed by a single pixel of an image sensor, for four different example reflectance spectra. The relative intensities are sensed for the five primary light sources, as shown in Table 1, such that a relative reflected intensity for a given primary source (i.e., channel) is sensed when that primary source emits light onto the scene. In this example, the four example reflectance spectra correspond to four Color Evaluation Samples (CES) as defined in TM-30 and correspond to CES 5 (approximately maroon), CES 64 (approximately teal), CES 32 (approximately mustard), and CES 81 (approximately purple). As a specific example, Table 1 shows that the relative reflected intensity sensed by the image sensor 220 sensing a maroon portion of a scene while a royal blue primary light source is emitting royal blue light onto that part of the scene is 0.098. Similarly, as shown in Table 1, the relative reflected intensity sensed by the image sensor 220 sensing a maroon portion of a scene while a red primary light source is emitting red light onto that part of the scene is 0.5468. Because the color red is closer to the approximate maroon of the scene, the relative reflected intensity sensed when the red primary light source is activated is higher (i.e., 0.5468) than when the royal blue primary light sources is activated (i.e., 0.098). Using this technique, in accordance with this implementation, the controller may develop a color map of the scene based on the data gathered via the pixel(s) of the image sensor.

TABLE 1

| | | Primary Light Sources (LED Channels) | | | | |
| --- | --- | --- | --- | --- | --- | --- |
| CES | Approx. Color | Royal Blue Ch1 | Lime Ch2 | Red Ch3 | Cyan Ch4 | PC Amber Ch5 |
| 5 | Maroon | .098 | .2147 | .5468 | .057 | .3476 |
| 64 | Teal | .3621 | .242 | .0964 | .4902 | .1319 |
| 32 | Mustard | .0689 | .4679 | .5068 | .2481 | .5287 |
| 81 | Purple | .3272 | .1492 | .1856 | .202 | .1573 |

Figure 5:
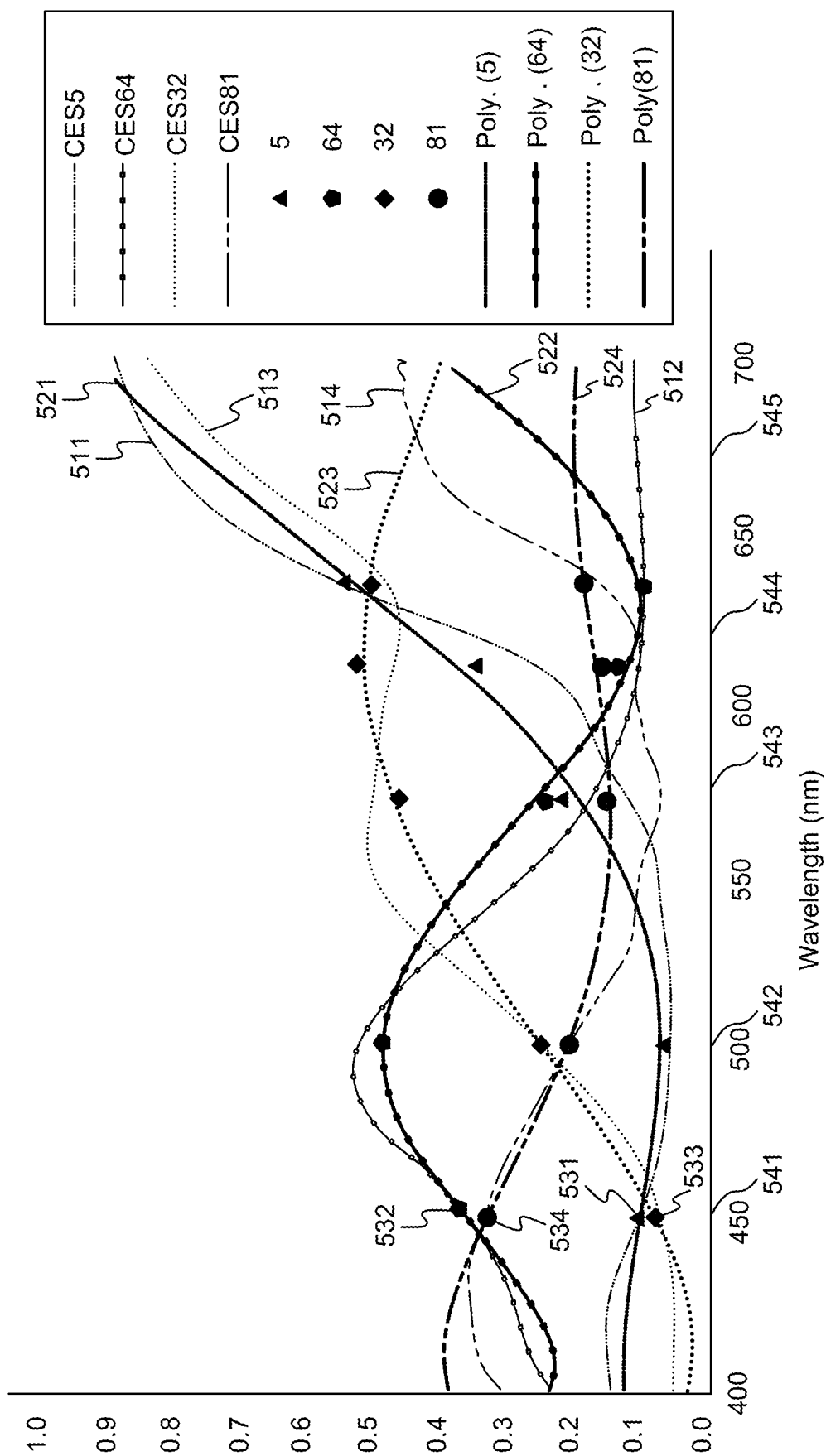
FIG. 5 shows an example chart of reference spectra with estimated reference spectra using the five primaries of FIGS. 3A and 3B and a polynomial fit algorithm.

According to another implementation, a color map may be expressed in a standardized color space such as CIE1931, CIE1976, CAM02-UCS, or the like. Expressing the color map in such a standardized color space may allow more advanced spectral optimization algorithms and/or more intuitive programming of the desired response. The reflectance spectrum of each pixel of an image sensor may be estimated and, subsequently the associated color coordinates for the pixel may be calculated based on the estimated reflectance spectrum. FIG. 5 shows an example implementation including reflectance spectra of CES 5, CES 64, CES 32 and CES 81 colors from TM-30 represented by solid lines 511, 512, 513 and 514 respectively. Dashed lines 521, 522, 523, and 524 show the respective estimated reflectance spectra using the five primary light sources of FIGS. 3A and 3B.

The dashed lines 521, 522, 523, and 524 are estimated based on the image data collected by an image sensor. As a specific example, as shown in FIG. 3B, the royal blue primary channel emits a peak wavelength at 450 nm shown by 541. Accordingly, FIG. 5 shows that the relative reflected intensity sensed by an image sensor, such as image sensor 220 of FIG. 2, senses four different CES color points 531, 532, 533, and 534 while the royal blue primary channel is activated, and emits a peak wavelength at 450 nm shown by 541. The four different CES color points in this example correspond to the maroon (CES 5) 531, the teal (CES 64) 532, the mustard (CES 32) 533, and the purple (CES 81) 534. The five wavelengths corresponding to the five primary light sources are shown by 541 for the royal blue, 542 for the cyan, 543 for the lime, 544 for the amber, and 545 for the red. As a specific example, while the royal blue primary light source is activated to emit sensing light at 450 nm, shown by 541, the image sensor may register a relative reflectance intensity of roughly 0.098 corresponding to the maroon CES 5, as shown by point 531 in FIG. 5, and a relative reflectance intensity of roughly 0.3621 corresponding to the teal CES 64, as shown by point 534. Similarly, in the example shown in FIG. 5, the image sensor 220 may capture four CES color points at the peak wavelength for each of the five primary light sources of FIGS. 3A and 3B, for a total of 20 SPD data points, in this example. To summarize, by cycling through the five primaries and recording the reflected intensity via the image sensor, SPD data points are obtained at the centroid wavelength of each primary. An approximate reflectance spectrum can subsequently be estimated based on these data points via polynomial fits such as those shown by the dashed lines 521, 522, 523, and 524. Each dashed line 521, 522, 523, and 524 represents a best polynomial fit for a respective CES color based on data points collected at peak wavelengths of the five primary sources, with conditions defined at 380 nm and 780 nm. It should be noted that other interpolation methods may also be used such as a linear interpolation, spline interpolation, or moving average interpolation.

Figure 6:
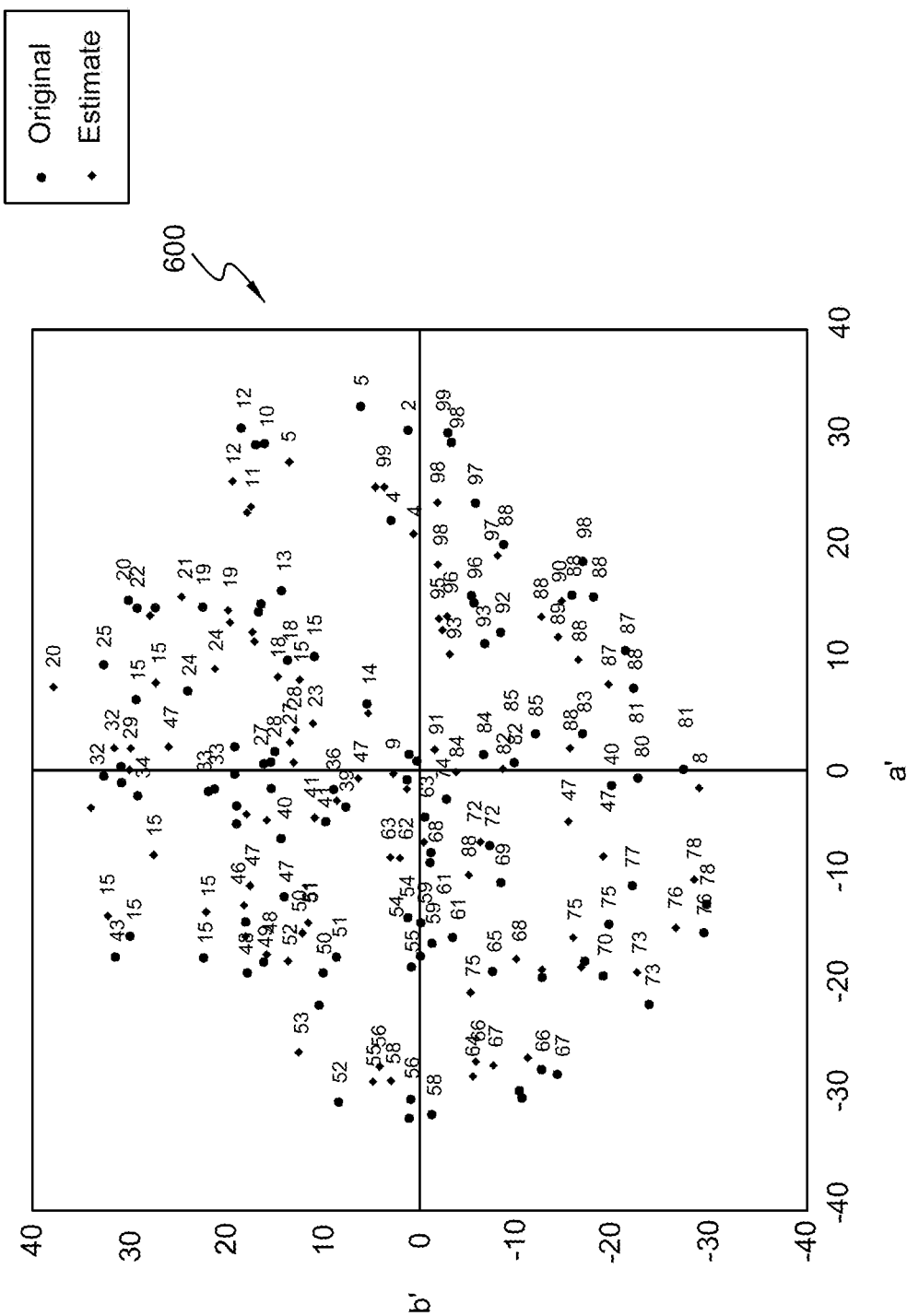
FIG. 6 shows actual color points of TM-30 CES 1-99 in CAM02-USC and estimated color points using the five primaries of FIGS. 3A and 3B.

Generally, the accuracy of the approximation may improve with an increasing number of primary light sources and may be the highest when the primary light sources have narrow bandwidth and are spread out evenly over the visible spectrum. As a reference, FIG. 6 shows an analysis of the polynomial fit with the five primaries of FIGS. 3A and 3B where data points for all 99 CES colors from TM-30 were calculated by sequentially activating each of the five primaries. FIG. 6 shows a graph 600 where of the 99 CES from TM-30, 58 CES colors are identified by their correct TM-30 hue bin (1-16), and 96 CES colors are identified correctly within plus or minus one hue bin. In FIG. 6, the circles represent the original CES color point and the corresponding diamond represent the estimated color point as determined by using the five primary light sources.

At 160 of FIG. 1, the spectrum optimization criteria for primary light sources may be determined based on the reference information and one or more desired output parameters. As further discussed herein, the spectrum optimization criteria may be the criteria that the primary light sources are operated based on when emitting a lighting spectrum onto a scene. Accordingly, the spectrum optimization criteria are the criteria that achieve the desired output based on the reference information of the scene. The reference information may be determined based on combined image data as disclosed herein in reference to 150 of FIG. 1. The desired output parameters may be generated via any applicable manner such as based on user input, based the location of a device or component, based on the image data, based on predetermined criteria, or the like. A user may provide input via a wireless signal such as via Bluetooth, RFID, infrared, or the like. Alternatively, a user may provide input via a keyboard, mouse, touchpad, haptic response, voice command, or the like. A controller, such as controller 250 of FIG. 2, may utilize the reference information and the desired output parameter(s) to generate the spectrum optimization criteria.

Figure 8:
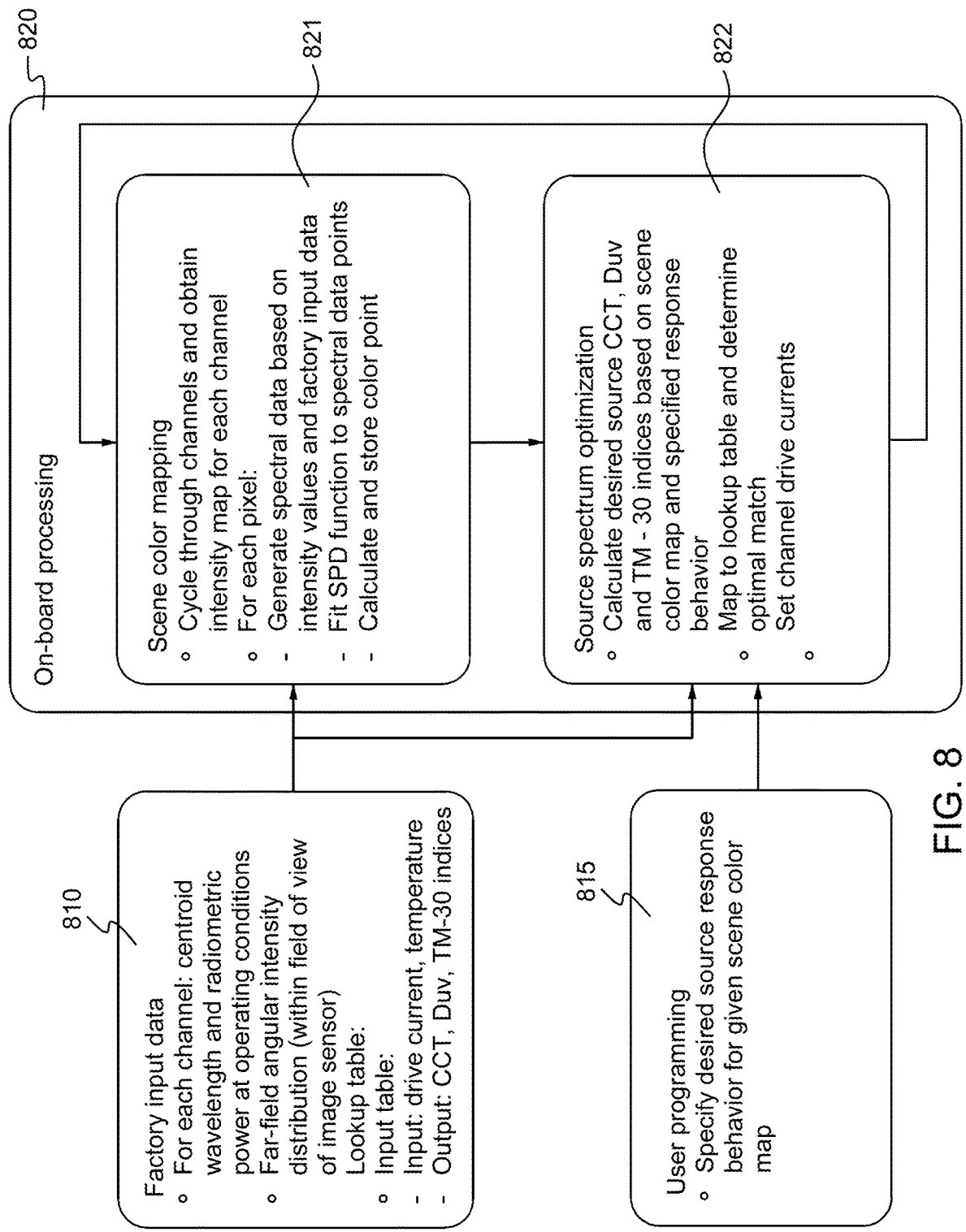
FIG. 8 shows a flowchart for factory input data provide to an on-board processing unit.

According to an implementation, spectrum optimization criteria may be pre-calculated offline based on potential image data and output parameters and may be stored via an applicable technique, such as a lookup table, on a controller or a memory accessible by the controller. Such pre-calculation and storing may reduce the need for complex calculations by an on-board controller that may be limited in its computational ability. FIG. 8 shows an example flowchart diagram of such an implementation. As shown, factory input data 810 may be provided to an on-board processing system 820. Specifically, the factory input data 810 may be provided to a scene color mapping module 821 to generate spectral data points based on for example, image data collected while primary light sources emit a sensing spectrum as well as intensity values and factory input data 810. The factory input data 810 may also be provided to a source spectrum optimization module 822 which may calculate desired indices/spectrum optimization criteria based on: the output from the scene color mapping module 821 and specified response behavior (output parameters) from the user programming module 815. The spectrum optimization module 822 may also set the channel drive currents based on the determined spectrum optimization criteria.

At 170 of FIG. 1, the plurality of primary light sources may be activated to emit a lighting spectrum based on the spectrum optimization criteria. The spectrum optimization criteria may be provided to the plurality of primary light sources by the controller either directly or via applicable communication channels, such as a wired or wireless communication channel as further disclosed herein.

Figure 7A:
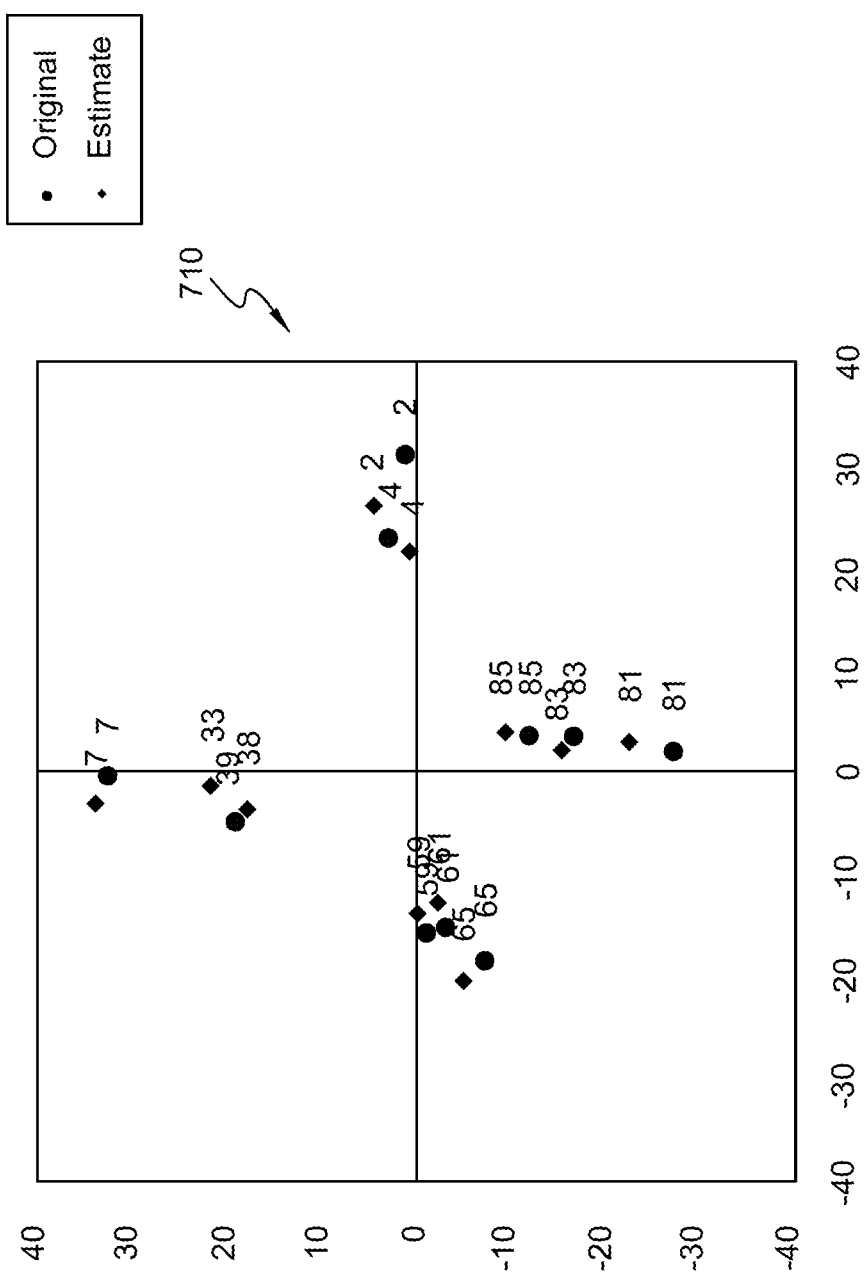
FIG. 7A shows example color points of several CES in each of the hue bins 1, 5, 9 and 13.
Figure 7B:
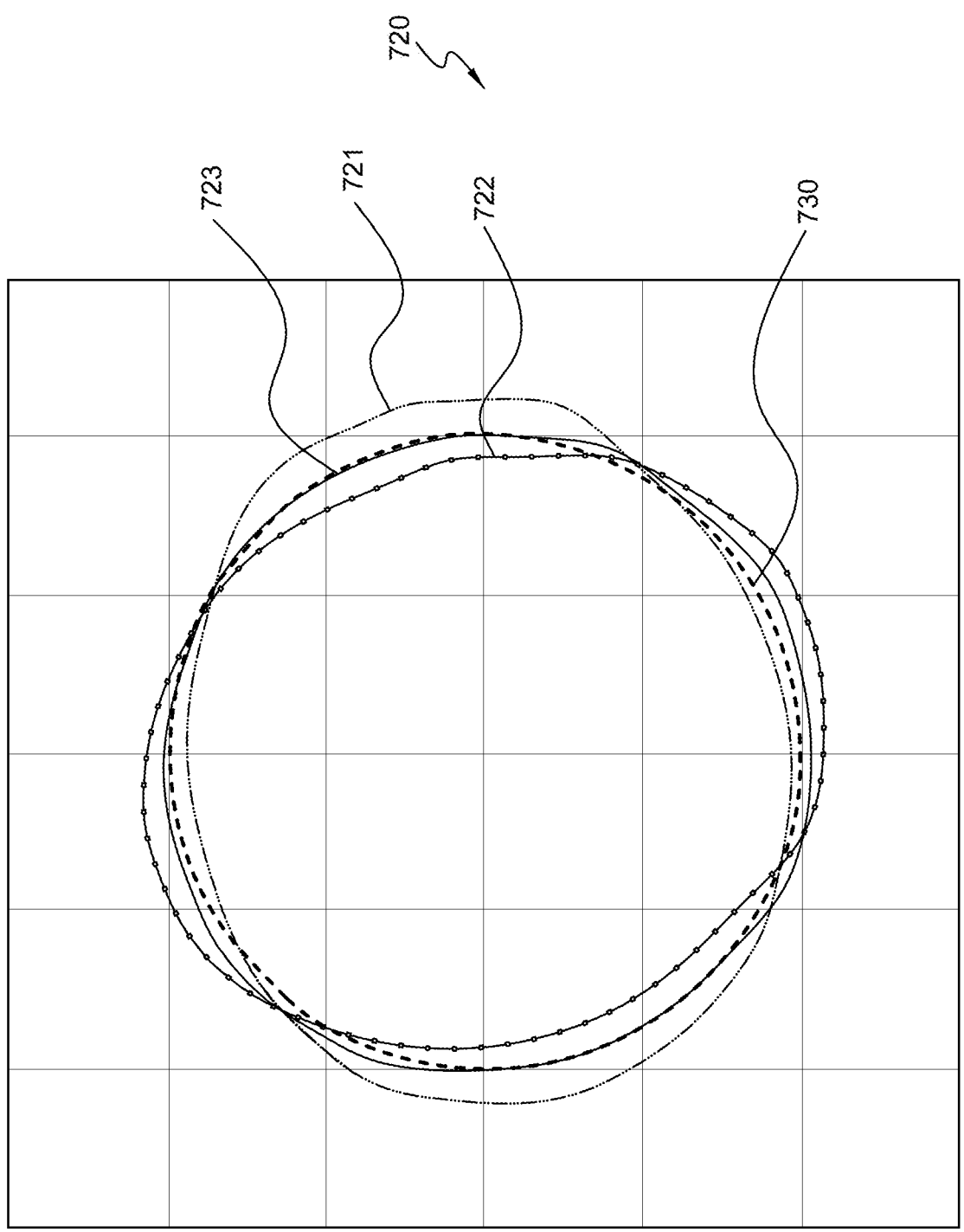
FIG. 7B shows an example color vector diagram showing three color rending modes for high saturation of the huge bins or high fidelity of FIG. 7A.

According to an implementation of the disclosed subject matter, the spectrum optimization criteria may result in different color rendering modes to be emitted. For example, the desired output parameters may be to maximize the saturation or fidelity of the most contrasting dominant colors in a scene. A controller may utilize the image data to determine the most contrasting dominant colors in a given scene and generate spectrum optimization criteria for the light sources to emit such that the saturation or fidelity of those colors is maximized. As an example, the five primary light sources of FIGS. 3A-B may be used for color saturation. FIG. 7A shows chart 710 that includes estimated and actual color points of several CES colors in each of the TM-30 hue bins 1, 5, 9, and 13. As shown in FIG. 7A via chart 710, color saturation may primarily be achieved in either of two directions: along the red to cyan axis (e.g., TM-30 hue bins 1 and 9) shown along the horizontal axis in FIG. 7A or the green-yellow to purple axis (e.g., bins 5 and 13) shown along the vertical axis in FIG. 7A. Accordingly, as a specific example, as shown in FIG. 7B, a controller may select spectrum optimization criteria based on one of three color rendering modes where the bins correspond to TM-30 hue bins and 730 corresponds to a perfect TM-30 circle: (1) bin 1 and bin 9 oversaturation if mainly red and/or cyan are detected as represented by trace 721, (2) bin 5 and bin 13 oversaturation if mainly green-yellow and/or purple are detected as represented by trace 722, and (3) a high fidelity spectrum if there is no dominant color detected in one of these hue bins as represented by trace 723.

According to an implementation, a controller may, based on output parameters, select optimization criteria for a spectrum that maximizes oversaturation of the dominant color detected, or a spectrum that maximizes oversaturation of all detected colors weighted by their occurrence. In some implementations, slightly oversaturated colors may be subjectively preferred, as may be indicated by the output parameters. Further, according to an implementation, oversaturation may be quantified by chroma shift such as, for example, the Rcs indices in TM-30. A typical preferred range for Rcs may be 0-20%, and a more preferred range may be 5-10%.

Further, according to an implementation, image data may be compared to a previously recorded image data to determine the colors of a moving or new object of interest such that the spectrum can be optimized for this object. Alternatively, the average reflectance spectrum of the image may be used to optimize the spectrum for the average color. In the optimization of the spectrum, the chromaticity may be kept constant or allowed to change.

According to an implementation, the output parameters may correspond to targeting a certain chromaticity of the emitted light, based on a given scene as determined based on the image data. For example, a cool white may be desirable when the scene contains cool hues such as blue, cyan and green, whereas a warm white may illuminate yellow, orange and red hues. Such a scheme may enhance color gamut and visual brightness of the scene. According to this example, a controller may provide spectrum optimization criteria corresponding to three or more primaries.

According to an implementation, the output parameters may correspond to achieving a desired color point. According to this implementation, a controller may utilize the reflected light information within the image to determine the spectrum optimization criteria for the emitted spectrum that is needed to achieve a desired overall color point. For example, in a space where a colored object or wall is illuminated near a white background, the light reflected off the colored object or wall may cause the white background to appear non-white, may be undesirable, as indicated by the output parameters. Accordingly, a controller may generate spectrum optimization criteria such that the primary light sources emit a lighting spectrum that maintains the white background as white.

Table 2 shows a summary of example output parameters, example image data, and corresponding example spectrum optimization criteria.

TABLE 2

| Output Parameter | Image Data | Spectrum optimization criteria |
| --- | --- | --- |
|  | Array of color points (e.g. a', b') | CCT, Duv, Rf, Rg, Rcs, h1-16 |
| High saturation or high fidelity mode (preferred embodiment with 5 primaries) | >50% of scene in hue bins 16, 1, 2 and 8-10 | Max Rcs, h1, max Rcs, h9, Rf > 75 |
|  | >50% of scene in hue bins 4-6 and 12-14 | Max Rcs, h5, max Rcs, h13, Rf > 75 |
|  | Neither of the above | Rf > 90, max Rg |
| Maximize saturation of dominant color | Dominant color with high chroma (sqrt(a'2 + b'2) > 15) | Max Rcs for hue bin of dominant color, Rf > 75 |
| Maximize overall color saturation | Mixed scene | Max Rcs for each hue bin weighted by occurrence and |

TABLE 2-continued

| Output Parameter | Image Data | Spectrum optimization criteria |
|---|---|---|
| White point correction | >25% of scene with low chroma (sqrt(a'2 + b'2) < 10) and >25% of scene with high chroma | CCT and Duv corrected for average color of high chroma portion |
| Tune CCT to enhance gamut | Predominantly warm colors (a' > 0) or cool colors (a' < 0) | Reduced CCT for warm colors, increased CCT for cool colors |
| Highlight moving object with high saturation | Subtract from previous frame to detect moving object(s); determine dominant hue | Max Rcs for hue bin of detected moving object(s) |

According to an implementation, the lighting system disclosed herein may include a communication interface that may enable communication to an external component or system. The communication may be facilitated by wired or wireless transmissions and may incorporate any applicable modes including Bluetooth, WiFi, cellular, infrared, or the like. According to an implementation, the controller may be external to the lighting system such that image data is provided to the external controller and spectrum optimization criteria is determined and/or provided by the external controller. Additionally or alternatively, output criteria may be provided via an external input device (e.g., a mobile phone) and/or may be provided to an external component such as an external controller.

According to an implementation, the sensing spectrum may be emitted by a first subset of primary light sources while a lighting spectrum is emitted by the remaining or other subset of primary light sources. The first subset may emit the sensing spectrum such that the sensing spectrum is not visible to humans (e.g., at a high frequency). Image data may be collected, as disclosed herein, based on the first subset emitting the sensing spectrum and may subsequently be collected when a second subset emits a sensing spectrum subsequent the first subset switching to emitting a lighting spectrum.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
illuminating a scene with a first sensing spectrum emitted by a first subset of a plurality of primary light sources;
capturing a first image of the scene while the scene is illuminated with the first sensing spectrum, the first image comprising a plurality of pixels;
illuminating the scene with a second sensing spectrum emitted by a second subset of the plurality of primary light sources;
capturing a second image of the scene while the scene is illuminated with the second sensing spectrum, the second image comprising the plurality of pixels;
generating a color map of the scene assigning a color point in a color space to each of the plurality of pixels based on the first sensing spectrum, the first image, the second sensing spectrum, and the second image;
determining a lighting spectrum based on the color map; and
illuminating the scene with the lighting spectrum emitted by the plurality of primary light sources.

2. The method of claim 1, further comprising:
illuminating the scene with a third sensing spectrum emitted by a third subset of the plurality of primary light sources;
capturing a third image of the scene while the scene is illuminated with the third sensing spectrum, the third image comprising the plurality of pixels;
illuminating the scene with a fourth sensing spectrum emitted by a fourth subset of the plurality of primary light sources;
capturing a fourth image of the scene while the scene is illuminated with the fourth sensing spectrum, the fourth image comprising the plurality of pixels;
illuminating the scene with a fifth sensing spectrum emitted by a fifth subset of the plurality of primary light sources;
capturing a fifth image of the scene while the scene is illuminated with the fifth sensing spectrum, the fifth image comprising the plurality of pixels;
wherein generating the color map of the scene comprises assigning a color point in a color space to each of the pixels based on the first sensing spectrum, the first image, the second sensing spectrum, the second image, the third sensing spectrum, the third image, the fourth sensing spectrum, the fourth image, the fifth sensing spectrum, and the fifth image.

3. The method of claim 1, wherein illuminating the scene with the first sensing spectrum comprises modulating the light output from the first subset of the plurality of primary light sources with a modulation amplitude not substantially visible to humans, and illuminating the scene with the second sensing spectrum comprises modulating the light output from the second subset of the plurality of primary light sources with modulation amplitude not substantially visible to humans.

4. The method of claim 1, wherein illuminating the scene with the first sensing spectrum comprises modulating the light output from the first subset of the plurality of primary light sources with a modulation frequency not substantially visible to humans, and illuminating the scene with the second sensing spectrum comprises modulating the light output from the second subset of the plurality of primary light sources with a modulation frequency not substantially visible to humans.

5. The method of claim 1, wherein the first image and the second image are provided to a controller configured to generate the color map.

6. The method of claim 1, wherein the first sensing spectrum, the second sensing spectrum, and the lighting spectrum are emitted through a first optic lens.

7. The method of claim 6, wherein the first image and the second image are captured through a second optic lens.

8. The method of claim 1, wherein the lighting spectrum is determined based on a lookup table.

9. The method of claim 8 wherein the lookup table is stored on a controller or stored on a memory accessible by a controller.

10. A device comprising:
a plurality of primary light sources configured to illuminate a scene through a first optic with a first sensing spectrum, a second sensing spectrum, and a lighting spectrum;
an image sensor configured to capture through a second optic a first image of the scene while the scene is illuminated with the first sensing spectrum, the first image comprising a plurality of pixels, and to capture through the second optic a second image of the scene while the scene is illuminated with the second sensing spectrum, the second image comprising the plurality of pixels;
a controller configured to control the plurality of primary light sources to illuminate the scene with the first sensing spectrum and the second sensing spectrum, to generate a color map of the scene comprising a color point in a color space for each of the plurality of pixels based on the first sensing spectrum, the first image, the second sensing spectrum, and the second image, to determine the lighting spectrum based on the color map, and to control the plurality of primary light sources to illuminate the scene with the lighting spectrum.

11. The device of claim 10, wherein the first sensing spectrum is emitted by a first subset of the plurality of primary light sources and the second sensing spectrum is emitted by a second subset of the plurality of primary light sources.

12. The device of claim 10, wherein the image sensor does not have wavelength-resolving capability.

13. The device of claim 10, comprising a housing in which are located the controller and the primary light sources.

14. The device of claim 10, wherein the controller and the primary light sources are housed separately.

15. The device of claim 10, wherein the controller accesses a lookup table to determine the lighting spectrum.

16. A method of operating a light-emitting diode (LED) lighting system, the method comprising:
sequentially modulating each of a plurality of LED channels to illuminate a scene with a different color of light during each modulation;
capturing an image of the illuminated scene during each modulation;
generating a color map of the illuminated scene based on an estimated reflectance of each pixel in the recorded image for each modulation, the color map assigning a color point in a color space to each of the pixels; and
setting a drive current for each of the plurality of channels based on a desired rendering mode and the generated color map.

* * * * *